March 12, 1968  E. R. LEE  3,372,897
REAR VIEW MIRROR
Filed March 28, 1966
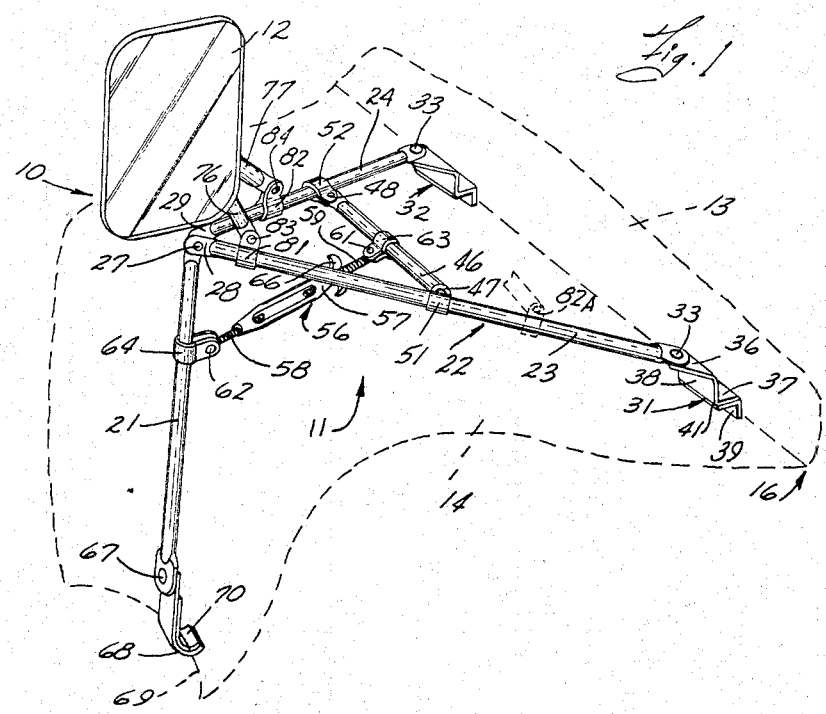
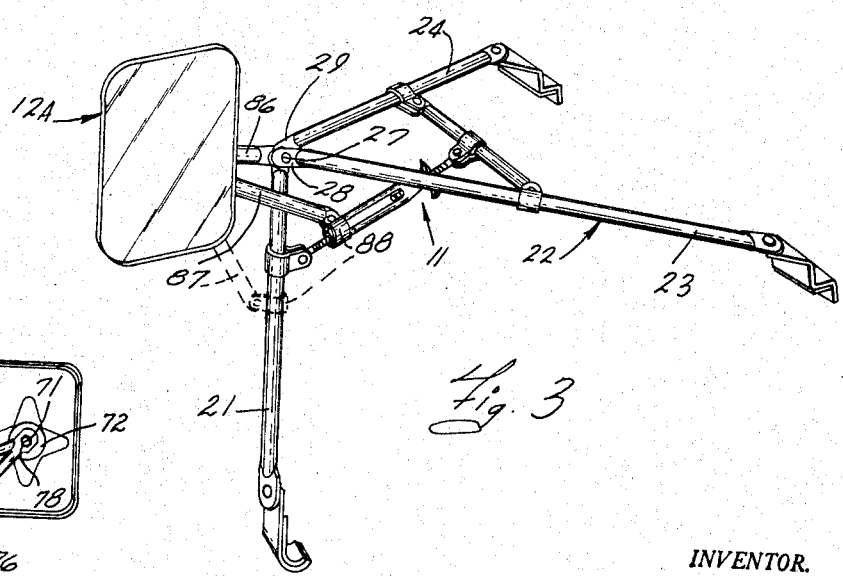
INVENTOR.
EDWARD R. LEE
BY
Woodhams, Blanchard & Flynn
ATTORNEYS

United States Patent Office 3,372,897
Patented Mar. 12, 1968

3,372,897
REAR VIEW MIRROR
Edward R. Lee, Ceresco, Mich., assignor to S. H. Leggitt Company, Inc., Marshall, Mich., a corporation of Michigan
Continuation-in-part of application Ser. No. 454,476, May 10, 1965. This application Mar. 28, 1966, Ser. No. 538,010
The portion of the term of the patent subsequent to July 5, 1983, has been disclaimed
11 Claims. (Cl. 248—480)

ABSTRACT OF THE DISCLOSURE

A mirror construction for an automotive vehicle having a frame including a pair of divergent substantially horizontal arms joined adjacent one end thereof, the other end of the arms having brackets thereon engageable between the hood and fender of the vehicle. A cross member extends between the arms for interconnecting same. The upper end of a downwardly and inwardly extending leg is pivotally connected to the joined ends of the arm, the lower end of the leg having a bracket thereon engageable with the edge of the adjacent wheel opening. Tension means interconnect the frame and the leg to cause the mirror frame to securely grip the vehicle. Arm means are connected to the frame means, which arm means has a mirror secured at one end thereof.

---

This application is a continuation-in-part of my copending application Ser. No. 454,476, filed on May 10, 1965, and now U.S. Patent No. 3,259,349.

This invention relates to a rear-view mirror construction and more particularly relates to a rear-view mirror construction having a support frame which is rigidly mountable on the outside of a vehicle and is readily removable from the vehicle.

With growing numbers of vehicles towing trailers, there is an increasing demand for rear-view mirror constructions which support the mirror in a position outwardly spaced from the side of the vehicle for enabling the driver to see what lies behind a relatively wide trailer being towed. It is desirable that the mirror support be sufficiently sturdy as to support a relatively large and heavy mirror at a substantial distance from the vehicle without allowing the mirror to vibrate or become misadjusted while the vehicle is in motion. Many users require that the mirror construction be quickly and readily installable and removable from the vehicle, as in the case of trailer owners wishing to use the mirror only during relatively infrequent hauling of the trailer. Others, particularly trailer rental agencies which also supply mirrors to their clientele, require that such mirror constructions be adaptable by simple adjustments and with a minimum of time and effort to a wide variety of cars and trucks without in any way damaging or requiring modification of the vehicle.

Previous mirrors of the type described have in general not been completely satisfactory in use either when permanently installed or when frequently removed from and installed on a particular vehicle or a series of different vehicles. Previous mirror constructions are known, for example, in which the upper portion of the mirror support is affixed to a door of the vehicle and the remainder depends therefrom and rests against the lower part of the door, the mirror construction being held in position merely by its own weight. Mirrors on such construction have been found to vibrate and even to move out of adjustment as a result of engine vibration, bumps in the road or wind loading.

Prior mirror constructions which depend upon a spring or other resilient member to clamp the mirror construction in position on the vehicle have in general also been unsatisfactory. Such constructions have often been insufficiently rigid as to maintain the mirror fixed with respect to the vehicle and driver particularly on rough roads or the like, the mirror often vibrating or shifting to a new position.

Accordingly the objects of this invention include:

(1) To provide a rear-view mirror construction which includes a mirror support rigidly but removably affixable to a vehicle.

(2) To provide a construction, as aforesaid, capable of rigidly supporting a large heavy mirror at a position outwardly spaced from the body of the vehicle without allowing the mirror to vibrate and without flexing or becoming displaced despite wind loading, vibration or mechanical shocks imparted thereto by operation of the vehicle at high speeds or on rough roads.

(3) To provide a mirror construction, as aforesaid, which is readily adaptable without modification to a wide variety of cars and trucks, substantially of all makes, models and years, without modification or damage to the vehicle and with at most a few adjustments which can be carried out by the user without instruction with a simple screw driver and pliers.

(4) To provide a construction, as aforesaid, which when once adapted to a particular vehicle may be installed and moved quickly by the user without training and without tools by making a simple adjustment of the construction.

(5) To provide a construction, as aforesaid, which is capable of supporting a wide variety of mirrors of differing sizes and types without modification.

(6) To provide a mirror construction, as aforesaid, which when properly installed preloads the members thereof to maintain same in rigid relationship to each other.

(7) To provide a mirror construction, as aforesaid, which is readily manufacturable from commonly available parts with only rudimentary operations thereon, which can be manufactured singly with common hand tools or mass produced in large quantities, which is low in cost to manufacture and maintain, which is sturdily constructed for a long service life and capable of being maintained by the user without special training and with commonly available tools.

Other objects and purposes of this invention will become apparent to persons acquainted with apparatus of this general type upon reading the following specification and inspecting the accompanying drawings.

In the drawings:

FIGURE 1 is an oblique view of a mirror construction embodying the invention and installed in a position of use on a vehicle indicated in broken lines.

FIGURE 2 is a rear view of the mirror shown in FIGURE 1.

FIGURE 3 is an oblique view of a modified mirror construction.

Certain terminology will be used in the following description of convenience in reference only and will not be limiting. The words "upwardly," "downwardly," "rightwardly" and "leftwardly" will designate directions in the drawings to which reference is made. The words "forwardly" and "rearwardly" will refer to the normal direction of the vehicle motion, forwardly being toward the left and rearwardly being toward the right in FIGURE 1. The words "inwardly" and "outwardly" will refer to directions toward and away from respectively the geometric center of the device and designated parts thereof. Said terminology will include the words above specifically mentioned, derivatives thereof and words of similar import.

DESCRIPTION

The mirror construction 10 (FIGURE 1) embodying the invention includes an adjustable support structure 11 for supporting a mirror 12 above and generally outboard of the hood 13 and front fender 14 of a vehicle such as an automobile or a truck generally indicated at 16. The support structure 11 includes a normally upwardly and outwardly extending leg 21 to which is secured to substantially sidewardly extending frame 22.

The frame 22 comprises a preferably identical pair of divergent arms 23 and 24 joined at the outboard or leftward, as seen in FIGURE 1, ends thereof. The outer ends of the arms 23 and 24 are affixed to the upper end of the leg 21 by any convenient fastening means 27 such as a nut and bolt arrangement. The arms 23 and 24 and leg 21 are preferably tubular and of metal such as chrome plated steel, the ends thereof, preferably being flattened and drilled. When the fastening means 27 is tightened, the ends 28 and 29 of the arms 23 and 24 firmly and immovably grip the upper end of the leg 21 and at least to some degree resists pivotal movement of the arms 23 and 24 about the axis of the fastening means 27. With the screw 27 loosened, the arms 23 and 24 and the leg 21 are freely pivotable with respect to each other.

The inboard or rightward ends of the legs 23 and 24 are affixed to preferably identical step brackets 31 and 32, respectively. The brackets 31 and 32 may be of any convenient configuration adapted to clamping between the hood 13 and fender 14 of the vehicle. In the present embodiment, said brackets each comprises a pair of stepped, substantially horizontal portions 36 and 37 which are joined by a substantially vertical riser 38. The horizontal portion 36 preferably is pivotally affixed by a rivet 33 to the corresponding one of the arms 23 and 24. The edge of the horizontal portion 37 remote from the riser 38 has a depending flange 39. Thus, the outer side of the flange 39 normally rests against the inner surface of the fender, the horizontal portion 37 is normally gripped between the hood 13 and fender 14 and the riser 38 normally lies closely adjacent or rests against the outer surface of the hood 13. The portion 36 is thus elevated above the fender 14 as are normally the arms 23 and 24. At least the lower surface of the horizontal portion 37 is preferably provided with a resilient pad 41 for preventing the brackets 31 and 32 from slipping axially along the joint between the hood and fender.

A cross member 46, preferably of tubular construction similar to that of the arms 23 and 24, is preferably similarly flattened and drilled at its ends. The ends of the cross member 46 are pivotally secured by fastening means 47 and 48 to pivot clamps 51 and 52, respectively, which are arranged on the arms 23 and 24, respectively. Thus, by tightening of the fastening means 47 and 48, the ends of the cross member 46 may be rigidly fixed to the arms 23 and 24. Loosening of the fastening means 47 and 48 allows the ends of the cross bar 46 to slide along the arms 23 and 24 to a different location.

A tensioning assembly 56 extends between the cross member 46 and the leg 21. In the particular preferred embodiment shown, the tensioning assembly 56 comprises a turnbuckle 57 including axially extending eye bolts 58 and 59. The eyes of the eye bolts 58 and 59 are secured by fastening means 61 and 62 to pivot clamps 63 and 64, respectively, which are disposed on the cross member 46 and leg 21, respectively. The pivot clamps 63 and 64 are preferably indentical to the above-mentioned pivot clamps 51 and 52. Thus, tightening of the fastening means 61 and 62 rigidly fixes the clamps 63 and 64 to the cross member 46 and leg 21 to prevent relative movement between the ends of the eye bolts 58 and 59 and said leg and cross member. The tightened clamps 63 and 64 preferably allow pivotal movement of the eye bolts about the axes of the fastening means 61 and 62. A lock nut 66, in the particular embodiment shown a wing nut, is threaded on one of the eye bolts 58 and 59, here the eye bolt 59, for locking against the adjacent end of the turnbuckle 57. Axial adjustment of the length of the turnbuckle 57 normally causes the arms 23 and 24 to pivot about the fastening means 27 toward or away from the leg 21.

The lower end of the leg 21 is preferably pivotally secured, here riveted as indicated at 67 to the upper end of a depending hook 68, here a segment of strap steel bent into a generally J-shaped configuration. The curved lower portion of the hook 68 is directed inwardly and adapted for hooking under the upper edge 69 of the wheel well in the fender 14. The inner surface of the hook 68 is preferably padded as indicated at 70.

The mirror 12 may be mounted on the adjustable support 11 in many different ways. For example, in FIGURES 1 and 2, the mirror 12 is provided with a threaded shaft 71 which is secured to the forward face of the mirror 12 by a ball joint 72 of any conventional construction. The shaft 71 passes through one of the flattened and drilled ends of a pair of arms or link members 76 and 77 and are held thereto by a nut 78. The other ends of the arms 76 and 77 are, likewise, flattened and drilled and secured to a pair of pivot clamps 81 and 82 by fastening means 83 and 84, said pivot clamps 81 and 82 being releaseably secured, in this embodiment, to arms 23 and 24, respectively. However, the pivot clamps 81 and 82 may be releaseably secured to just one arm of the frame 22 by placing the pivot clamp 82 on the arm 23 as indicated in dotted lines in FIGURE 1 and by the numeral 82A.

The mirror, of course, may also be secured to the frame 22 by only one arm, such as arm or link member 76 shown in FIGURE 1.

Adjustment of the height of the mirror with respect to the vehicle is achieved by movement of the pivot clamps 81 and 82 along the arm or arms 23 and 24.

The mirror 12A may also be mounted on the adjustable support 11 as shown in FIGURE 3. More particularly, one end of a tubular arm 86, which is flattened and drilled on both ends, is secured to the arms 23 and 24 between the flattened ends 28 and 29 by fastening means 27. The other end (not shown) is rigidly secured to the forward face of the mirror 12.

A second tubular arm 87, which is flattened and drilled on both ends, is secured at one end to the forward face of the mirror 12A. The other end is secured to the pivot clamp 88 by the fastening means 89. The pivot clamp 88 is designed to be clamped either to the tensioning assembly 56 or to the leg 21 as shown in dotted lines. Adjustment of the height of the mirror with respect to the vehicle is achieved by movement of the pivot clamp 88 along the length of the tensioning assembly 56 or along the length of the leg 21.

OPERATION

The mirror construction 10 may be installed upon a vehicle in any of a number of different ways. When mounting the mirror construction 10 on a particular vehicle for the first time, it is generally preferred that the fastening means 27, 47, 48, 61 and 62 be loosened for allowing the pivot clamps 51, 52, 63 and 64 to slide freely upon the corresponding ones of the arms 23 and 24, and cross member 46 and to allow free pivotal movement of the arms, leg, cross member and turnbuckle with respect to each other. The mirror construction in such condition will readily conform to the contours of the vehicle. With the hood 13 of the vehicle raised, the brackets 31 and 32 may be placed on the inner edge of the fender 14 with the pads 41 resting thereon, the flanges 39 extending into the zone normally closed by the hood 13 and the arms 23 and 24 extending outwardly over the fender 14. After the brackets 31 and 32 are spaced along the inner edge of the fender as desired, the hood 13 is shut, the edge thereof thus resting on the horizontal portions 37 of the brackets 31 and 32 to prevent relative movement therebetween.

The pads 41 are preferably of a material having a relatively high coefficient of friction, such as rubber, to further prevent movement of brackets toward and away from each other or along the edge of the fender.

The outer ends of the arms 23 and 24 normally extend above and outwardly from the fender 14. The leg 21 may now be pivoted inwardly or outwardly about the axis of the fastening means 27 and may be pivoted with respect to the pivot clamp 64 to allow the hook 68 to be moved into engagement with the upper edge 69 of the wheel well in the fender 14. The hook normally engages the wheel well edge at a point below the outer ends of the arms 23 and 24 and somewhat inwardly spaced therefrom. Thus, the leg 21 extends upwardly and outwardly from the hook 68. The pivot clamps 51, 52, 63 and 64 may now be tightened to render the mirror construction of a rigid unit affixed to the vehicle. Finally, the grip of the mirror construction 10 on the vehicle may be substantially increased by tightening the turnbuckle 57 which strongly urges the hook 68 toward the brackets 31 and 32 and rigidly clamps the mirror construction to the vehicle. The turnbuckle is capable when tightened of prestressing causing a small elastic deformation of the arms, leg and cross member to increase the rigidity with which the mirror 12 is fixed to the vehicle. When the turnbuckle is tightened sufficiently, the wing nut 66 is tightened against the body of the turnbuckle to prevent inadvertent loosening thereof. Installation is completed by conventional and suitable adjustment of the plane of the mirror 12 by swivelling same around the ball joint 72 to provide the desired field of vision.

It is normally desirable that the ends of the turnbuckle 57 be spaced from the upper end of the leg 21 by substantially equal distances to minimize the axial component of force on the clamps and to maximize the force with which the mirror construction grips the vehicle. Similarly, the clamp 63 is preferably centered on the cross member 46 and the ends of the cross member 46 are preferably equally spaced from the upper end of the leg 21.

The mirror may be removed from the vehicle in any of several ways. The mirror construction 10 is particularly advantageous in that it may be removed without tools and very quickly by loosening the lock nut 66, extending the turnbuckle 57 to move the hook 68 downwardly and outwardly out of engagement with the fender 14, and raising the hood 13 to release the brackets 31 and 32.

To reinstall the mirror construction 10 on the same vehicle from which it has thus been removed, the above steps of removal may be reversed.

Once the mirror is adjusted to the desired height by manipulation of the pivot clamps 81 and 82 or 88, the fastening means 83 and 84 or 89 are tightened so that the mirror will be rigidly secured to the frame.

Although particular preferred embodiments of the invention have been disclosed above for illustrative purposes, it will be apparent that variations or modifications thereof which lie within the scope of the appended claims are fully contemplated.

The embodiments of the invention in which an exclusive property or privilege is claimed are defined as follows:

1. A mirror construction for mounting on a vehicle, comprising in combination:
   frame means fixed on one side thereof to said vehicle and extending transversely away therefrom;
   leg means in engagement with said frame means at a location spaced from said one side;
   engagement means on said leg means below said frame engageable with said vehicle at a point spaced from said one side;
   a mirror mounted on said frame means for adjusting into a selected position with respect thereto; and
   tension means extending obliquely between said frame means and said leg means for causing said leg means and said frame means to grip said vehicle therebetween.

2. The device defined in claim 1, further comprising means mounting said mirror to said frame, said means including a link member mounted at one end thereof to said mirror and at the other end thereof to said frame means.

3. In a mirror construction for mounting on an automotive vehicle engageable with said vehicle at the joint between the side edges of the hood and front fender thereof and at the edge of the adjacent wheel opening therein, the combination comprising:
   a frame including a divergent, substantially horizontal pair of arms joined at a location spaced from one end thereof;
   brackets on said one end of said arms engageable between the hood and fender of the vehicle;
   a cross member extending between said arms between the ends thereof;
   an upwardly and outwardly extendable leg pivotally affixed to the arms at the joined connection therebetween;
   a mirror and means for affixing said mirror to said frame;
   an upwardly opening hook affixed to the lower end of said leg for engaging the upper edge of the wheel opening of the vehicle fender;
   tension means connected between said cross member and said leg at a point on said leg spaced below said one end of said arms for urging said hook toward said brackets.

4. The device defined in claim 3, wherein the means affixing said mirror to said frame includes a link member mounted at one end thereof to said mirror and at the other end thereof to one of said arms.

5. The device defined in claim 4, wherein the pair of arms are joined together at the other end thereof.

6. A mirror construction for mounting on a vehicle, comprising in combination:
   frame means including arm means fixed at one end thereof to said vehicle and extending transversely away therefrom, and leg means in engagement with said arm means at a location spaced from said one end;
   engagement means on said leg means below said arm means engageable with said vehicle at a point spaced from said one end;
   tension means extending obliquely between said arm means and said leg means for causing said leg means and said arm means to grip said vehicle therebetween; and
   a mirror and means for affixing said mirror to said frame means, said means including a pair of link members, each of which is affixed to said mirror at one end thereof.

7. The device of claim 6, wherein the other end of each of said link members is interconnected to said arm means.

8. The device of claim 6, wherein the other end of one of said link members is mounted on said arm means and the other end of the other link member is mounted on said leg means.

9. The device of claim 6, wherein the other end of one of said link members is mounted on said frame means and the other end of the other link member is mounted on said tension means.

10. The device of claim 6, wherein the arm means include a pair of divergent substantially horizontal arms joined substantially adjacent one end thereof, the other ends of said arms having brackets thereon engageable between the hood and the fender of the vehicle, and a cross member extending between said arms between the ends thereof;
   said leg means comprising an upwardly and outwardly extending leg pivotally affixed to the joined ends of the arms, an upwardly opening hook affixed to the lower end of said leg for engaging the upper edge of the wheel opening of the vehicle fender; and said tension means being connected between said cross member and said leg at a point below the joined ends of said arms for urging said hook toward said bracket.

11. The device defined in claim 10, wherein the other ends of said pair of link members are mounted on said pair of arms.

References Cited

UNITED STATES PATENTS

| | | | |
|---|---|---|---|
| 2,552,074 | 5/1951 | Thompson | 248—279 |
| 2,898,070 | 8/1959 | De Vaan | 248—226 |
| 3,081,057 | 3/1963 | Farnsworth | 248—484 |
| 3,114,530 | 12/1963 | Shilling | 248—226 XR |
| 3,142,469 | 7/1964 | Clemmer | 248—226 |
| 2,259,349 | 7/1966 | Lee | 248—226 |

ROY D. FRAZIER, *Primary Examiner.*